Patented Sept. 10, 1946

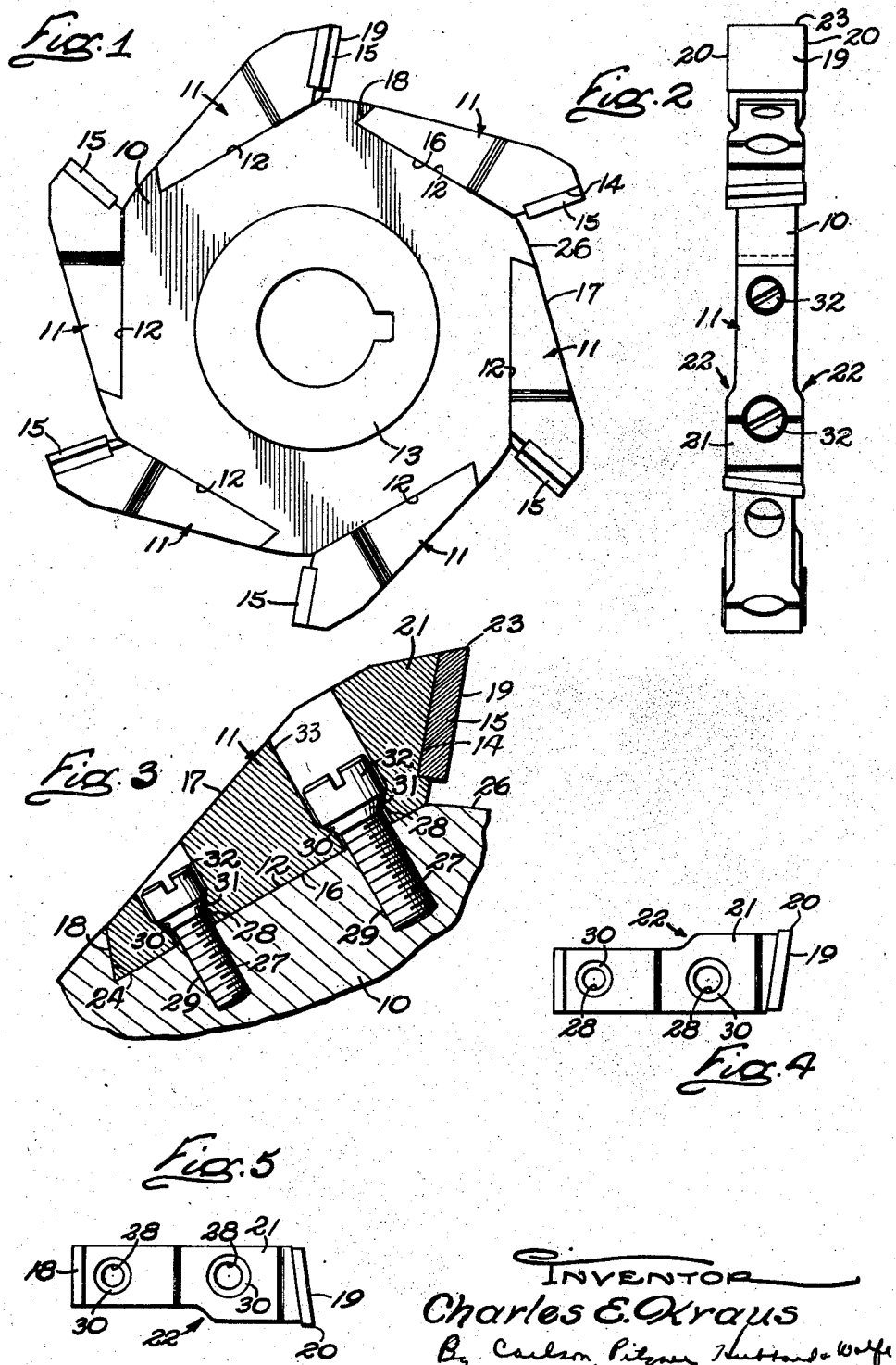

2,407,501

UNITED STATES PATENT OFFICE 2,407,501

CUTTER

Charles E. Kraus, Rochester, N. Y.

Application September 11, 1944, Serial No. 553,484

5 Claims. (Cl. 29—105)

This invention relates to metal removing tools or cutters having individually replaceable blades.

A general object is to provide a cutter which combines most of the advantages of cutters of the inserted blade and so-called solid types.

Another object is to provide a tool having one or more detachable blades constructed and mounted in such a way that various cutting angles may be obtained without altering the construction of the tool body.

A further object is to provide a novel detachable blade constructed and mounted in such a way that various cutting angles may be obtained without altering the construction of the tool body.

A further object is to provide a novel detachable blade construction and mounting therefor which avoids overhang of the blades with respect to the supporting body, which avoids the use of wedges, serrated surfaces, body slots, etc., and which enables small size rotary cutters to be produced without the loss of tooth or body strength.

The invention also resides in the novel construction of the tool blades to facilitate manufacture and their use in various kinds of cutters, and to insure rigidity of mounting of the blade on the tool body.

Other objects and advantages of the invention will become apparent from the following detailed description taken in connection with the accompanying drawing, in which Figure 1 is an end view of a cutter embodying the present invention.

Fig. 2 is a side view.

Fig. 3 is a fragmentary sectional view taken longitudinally of one of the blades.

Figs. 4 and 5 are plan views of different forms of standardized blades.

While the invention is applicable to various types of cutters for carrying out different metal removing processes, it has been shown for purposes of illustration embodied in a rotary milling cutter comprising a body in the form of a generally flat ring 10 and a plurality of separately formed blades 11 annularly spaced around and detachably secured against mounting surfaces 12 on the outer periphery of the body. The latter is made of steel or cast iron, as desired, formed with the usual hubs 13, and centrally recessed so that it may be mounted on and keyed to a spindle or arbor in the usual way. The blades may be made entirely of cutting material such as high speed steel, or, as shown, they may be of ordinary steel and formed at one end with recesses 14 for receiving tips 15 of carbide or other cutting material seated in and bonded to the defining walls of the recess.

Except for the width and inclination of their cutting faces, the blades 11 may be of the same construction for various kinds of cutters. Each blade comprises a block of metal having a flat bottom surface 16 and a top surface 17 which converges toward the bottom surface in the direction of the tail end 18 of the blade. This end is flat and of a width substantially equal to the thickness of the body 10. It extends transversely of the bottom surface 16 intersecting the latter at an acute included angle and the top surface 17 at an obtuse angle.

The other end of the blade is wider radially and defines a cutting face 19 terminating in end and side cutting edges 23 and 20 and inclined at the rake and shear angles desired to be imparted to the cutting edges. To space the side cutting edges 20 laterally from the sides of the blade and body 10, the end portion 21 of the blade is enlarged or made thicker than the tapered portion of the block. This offset, indicated at 22, may be on one side only of the block, as shown in Figs. 4 and 5, or, it may be on both sides (Fig. 2), and the amount of enlargement may vary with the character of the cutter to be produced. Also, by alternating the blades shown in Figs. 4 and 5, the offset on one side of the blade may be located on opposite sides in the case of different blades so as to form a staggered tooth slotting cutter. The top surface of the blade adjacent the cutting face 19 is, of course, shaped to provide proper clearance for the peripheral cutting edge 23. Similarly, the sides of the enlargement 22 and the tips 15 are finished to provide clearance for the cutting edges 20.

In accordance with the present invention, each blade 11 is seated on the periphery of the body 10 with the tail end 18 against an abutment 24 made integral with the body 10 so as to be capable of sustaining the forces that are exerted on the blade in the plane of rotation of the blade. To this end, annularly spaced portions of the body are cut away as by face milling to form the flat chordal surfaces 12 intersecting at one end with the body periphery 26 and at the other end with the abutment 24 which makes with the surface 12 precisely the same angle that the tail end 18 of the blade forms with the bottom surface 16. The abutment is of the same radial height as the blade end 18.

Means is provided for clamping the blade firmly against its seat 12 and also the abutment 24. Herein, this means comprises two cap screws 27 spaced longitudinally of the blade and projecting through holes 28 in the blade and threading into tapped holes 29 in the disk 10. The holes 29, which extend perpendicular to the blade and body surfaces 16 and 12, are located accurately with respect to blade end 18 and the abutment 24 in order to obtain full contact between the blade and the abutment when the blade is fastened to the body. To insure that such full contact will be obtained, the blade holes 28 are preferably counterbored at their upper ends as indicated at 33 to provide conical seats 30 which cooperate with mating surfaces 31 at the lower ends of the cylindrical screw heads 32 to cam the blades against the abutment as the screws are tightened. The holes 28 and the counterbores are made slightly larger than the screws to permit of this action which compensates for any slight inaccuracy in the location of the screw holes relative to the abutments. Preferably, the counterbores are deep enough to enable the screw heads 32 to be concealed within the blade and to locate the seats 30 close to the bottom of the blade.

With the blade thus seated and fastened to the body, the mounting is extremely rugged and well adapted to sustain the forces encountered in service use of the cutter in various types and with the cutting faces 19 of the blades positioned at widely varying rake and shear angles. The tangentially directed thrusts on the blade are sustained mainly by the abutment 24 and are directed along a line generally parallel to the bottom surface 16 of the blade. Tipping of the blade by this force is prevented by the screws 27 which also serve to sustain the side thrusts on the blade. This is for the reason that with the screw arrangement described, the conical bottoms of the screw heads are in full contact with the conical seats 30 around their entire peripheries so that the blade is held positively against sidewise shifting. The ability of the blades to withstand such side forces is increased by locating the seats 30 close to the bottom surface 16 thereby minimizing any possible deflection of the screw under the thrusts on the blade. As a result, the cutter as a whole possesses substantially all of the advantages inherent in so-called solid or integral tooth cutters while at the same time the individual blades are readily replaceable. As a consequence, the provision of body slots, fastening wedges, etc. as used in inserted blade cutters is avoided, and replaceability is achieved without sacrificing body strength.

Such ready replaceability of the blades contributes materially to the versatility of the cutter. The cutting faces 19 are, it will be observed, on the ends of the blades 11, and, as a consequence, the angles of these faces are not dependent upon the location of slots or other structural parts of the body as in the case of ordinary inserted blade cutters. To change the cutting angles, it is only necessary to substitute blades whose end faces are disposed at the angles desired, such angles being obtained by finishing of the blade before mounting in the cutter. Because the blades are not supported in open slots in the cutter body, the strength of the latter is not in any way affected by changing of the blades or the omission of certain blades in cases where it is desired to vary the number of teeth on the cutter.

It will be apparent that the blades 11 are of simple and inexpensive construction. As a result, repair of a damaged cutter is effected inexpensively simply by the substitution of a new blade, and this without the necessity of heating or otherwise distorting the cutter as is necessary in the case of the repair of solid cutters.

I claim as my invention:

1. A tool comprising a body having a flat blade seat thereon and a rigid abutment upstanding from said seat at one end thereof and disposed at an acute included angle with respect to the seat, a blade having a flat bottom resting on said seat and a tail end contacting said abutment, the top of said blade converging toward said bottom surface in the direction of said abutment, said body extending from said seat beyond the other end of said blade and shaped to fully expose the latter end, a cutting face formed on said other blade end and terminating in a cutting edge projecting laterally from said body, headed screws spaced longitudinally of said blade and projecting through the blade and into said body to clamp the blade against said seat, the heads of said screws having conical bottoms, and conical seats for said heads formed in said blade.

2. A tool comprising a body having a flat blade seat thereon extending to the surface of said body and a rigid abutment upstanding from said seat at one end thereof and disposed at an acute angle with respect to the seat, a blade having a flat bottom resting on said seat and projecting beyond said surface and a tail end contacting said abutment, the top of said blade converging toward said bottom surface in the direction of said abutment, said body projecting beyond said seat and the other end of the blade so as to expose the latter, a cutting face formed on said other blade end and terminating in a cutting edge, and headed screws spaced longitudinally of said blade and projecting through the blade and into said body to clamp the blade against said seat.

3. A tool comprising a body having a flat blade seat thereon and a rigid abutment upstanding from said seat at one end thereof, a blade having a flat bottom resting on said seat and a tail end contacting said abutment, the portion of said body beyond the other end of said blade being shaped to expose the latter, a cutting face formed on said other blade end and terminating in a cutting edge, headed screws spaced longitudinally of said blade and projecting through the blade and into said body to clamp the blade against said seat, the heads of said screws having conical bottoms, and conical seats for said heads formed in said blade.

4. A tool comprising a body having a succession of flat blade seats thereon and a rigid abutment upstanding from each seat one one end thereof, blades each having a flat bottom resting on one of said seats and a tail end contacting said abutment, said body being adapted to fully expose the other end of each blade, a cutting face formed on said other end of each blade and terminating in a cutting edge, a top on each blade converging toward the bottom surface in the direction of said abutment whereby to provide a chip recess in advance of the cutting face of the next adjacent blade, and screws projecting through said blades and into said body to clamp the blades against said seats.

5. A cutter blade comprising a block of material having opposite flat ends, a flat bottom surface and a top surface converging toward said bottom surface in the direction of one of said ends, the latter constituting an abutment surface disposed at an acute included angle to said bottom surface, an enlargement at the other end of said block providing a cutting face projecting laterally from at least one side of the block, and means defining spaced holes extending through said block at right angles to said bottom surface and counterbored at their upper ends to provide conical seats within said block.

CHARLES E. KRAUS.